Inventor.
Edwin P. Sundholm.

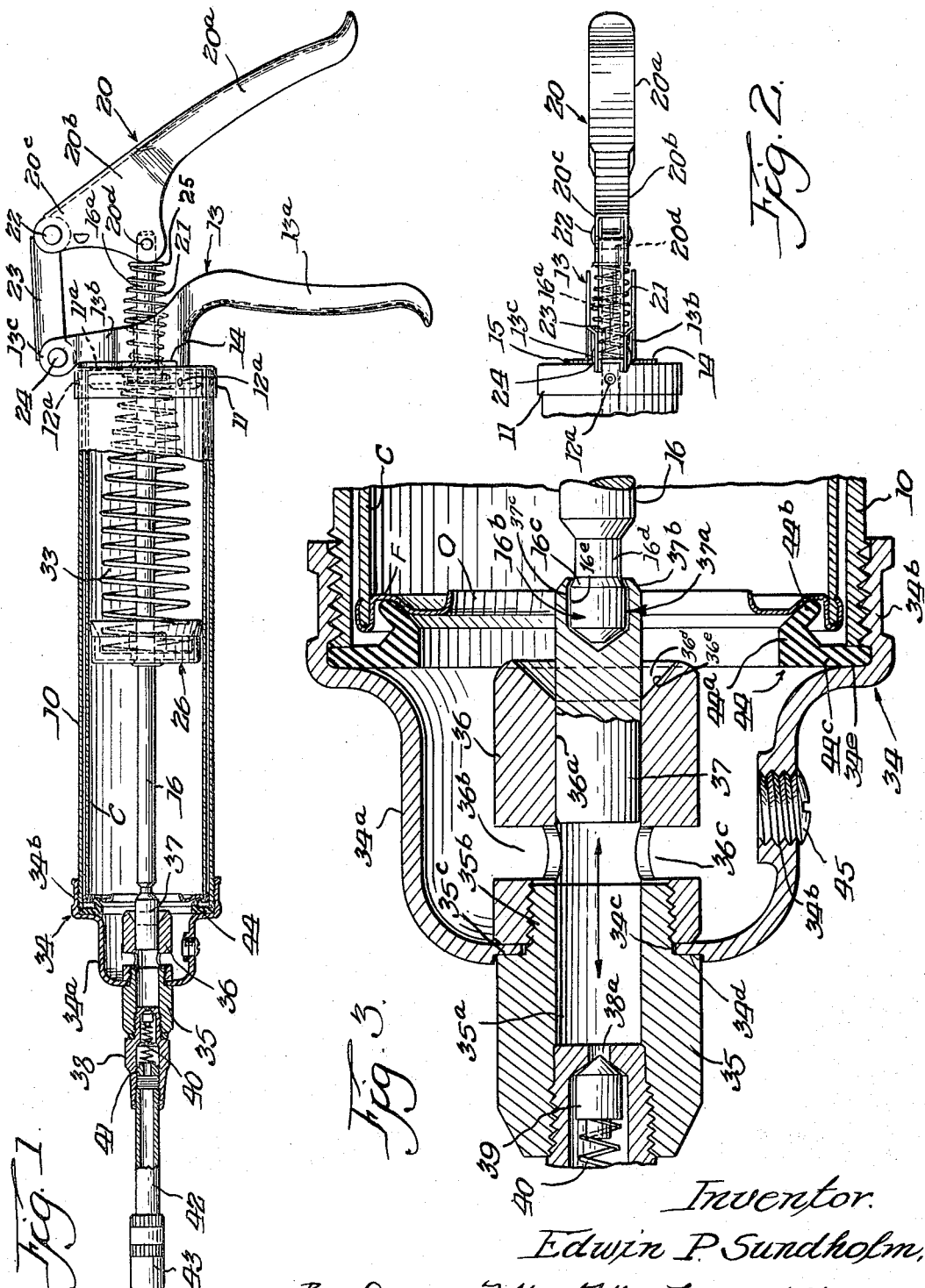

United States Patent Office 3,300,100
Patented Jan. 24, 1967

3,300,100
AXIALLY-OPERATED HAND GREASE GUN
Edwin P. Sundholm, Albert City, Iowa 50510
Filed Mar. 31, 1965, Ser. No. 444,156
4 Claims. (Cl. 222—260)

This invention relates to an axially-operated hand grease gun. More particularly, the invention is concerned with a grease gun which may be operated with one hand from the rear of the gun, the operating mechanism being axially aligned with and extending into the grease container.

For many years, hand grease guns have been of the lever-operated type, as shown in my prior Patents 2,218,366 and 2,436,701. With this kind of grease gun, the high pressure cylinder is mounted on the front cap with the piston extending laterally from the cylinder, and having its outer end pivotally connected to the operating lever. In using the lever-type grease gun, it is necessary for the operator to use both hands, one hand being used to grip the grease container or barrel of the gun, and the other hand being applied to the operating lever. Where the grease fitting is relatively inaccessible or where the grease gun must be operated in close quarters, lever-type grease guns can be quite inconvenient and even completely unusable. Prior one-hand grease guns which have the operating mechanism mounted on and extending laterally of the front cap provide little or no advantage in these respects over the lever-type guns.

An object of the present invention is to provide a hand grease gun which overcomes the problems and difficulties just described. More particularly, it is an object to provide a grease gun which can be operated with one hand from the rear of the gun, thereby permitting the barrel and grease applicator pipe to be used as a probe for greasing out-of-the-way fittings. A related object is to provide a grease gun of the character described where the grease dispensing mechanism is axially-operated, and is effective for the positive dispensing of grease under high pressure. Further objects and advantages will be indicated in the following detailed specification.

This invention is shown in illustrative embodiment in the accompanying drawings, in which—

FIGURE 1 is a side elevational view of a grease gun embodying the present invention, the internal components of the gun being shown in section for purpose of clarity;

FIGURE 2 is a fragmentary top view of the rear portion of the gun of FIG. 1;

FIGURE 3 is an enlarged fragmentary side elevational view of the grease gun of FIG. 1 showing the high pressure cylinder and associated components;

Figure 4:
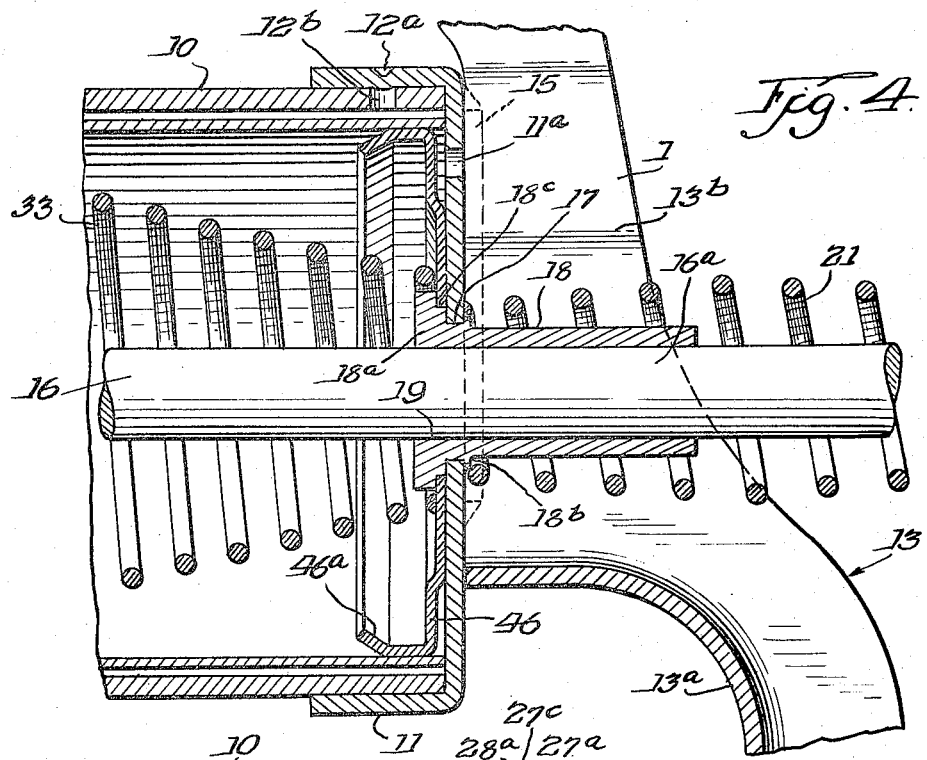
FIGURE 4 is an enlarged fragmentary side elevational sectional view of the grease gun of FIG. 1 showing the rear portion of the gun.

Looking first at FIG. 1, there is shown a grease gun having an elongated cylindrical grease container or barrel 10. A closure cap 11 is mounted on the rear of the container. In the illustration given, the cap 11 is received on the rear end portion of container 10, and permanently affixed thereto, for example, by inwardly-formed projections 12a which engage holes 12b at a plurality of circumferentially spaced points as shown in FIGS. 2 and 4. If desired, rear cap 11 can be removably connected to container 10 by providing these parts with cooperating threads, or by other suitable means.

A stationary hand grip designated generally by the number 13 is secured to the outside of cap 11 and extends laterally therefrom. In the illustration given, hand grip 13 is U-shaped in cross section, being formed from one piece of metal stock. It provides a downwardly extending handle portion 13a designed to be gripped by the hand, an intermediate portion 13b for attachment to cap 11 and an upper end portion 13c. The intermediate portion 13b may be attached to cap 11 by any suitable means, such as spot or projection welding, as indicated at 14 and 15 in FIG. 4.

The plunger rod 16 is axially disposed within container 10 for axial reciprocation therein. As shown more clearly in FIG. 4, rod 16 has a rearward portion 16a which extends through an opening 17, in rear cap 11. In the illustration given, a bushing or sleeve 18 is seated in opening 17 and provides a bore 19 for slidably supporting and guiding the rod extension 16a. The bushing 18 has an enlarged forward end 18a which seats against the inside of cap 11, and is locked thereto by swedging at 18b. Bushing 18 and rod portion 16a extend through a slot or opening 13d in the stationary hand grip portion 13b. As will be noted, rod portion 16a extends to a point rearwardly of cap 11 and the intermediate portion 13b of hand grip 13.

A movable hand grip 20 is pivotally connected at 20d to the outer end of rod portion 16a. Movable hand grip 20 cooperates with stationary hand grip 13 to move rod 16 forwardly. In the illustration given, hand grip 20 includes a downwardly extending handle portion 20a which is designed to be gripped with the hand, and intermediate portion 20b for pivotal connection to rod 16, and an upper portion 20c.

It will be understood that the means for reciprocating rod 16 from the rear of the container may be varied from the illustration given. With the embodiment shown, there is provided a compression spring 21 which is disposed around rod extension 16a between the hand grip portions 13b and 20b. Spring 21 functions as a compressible spring means for biasing the rod extension 16a and movable hand grip 20 to a rearward position outwardly of the stationary grip 13, as illustrated in FIG. 1.

In order that the pivoting of hand grip portion 20a towards hand grip portion 13a will move rod 16 forwardly and compress spring 21, the upper end 20c of the movable hand grip is pivotally connected at 22 to a link 23, which in turn is pivotally connected at 24 to the upper end 13c of grip 13. A washer 25 is slidably received on rod extension 16a between the outer end of spring 21 and the pivotally connected portion of grip 20.

A suitable plunger means designated generally by the number 26 (FIGS. 1 and 5) is slidably mounted on rod 16 within container 10. The preferred construction of the plunger means is shown more clearly in FIG. 5. It consists of a molded cup-shaped plunger having an outwardly flared rearwardly extending sealing lip 27a and a transversely extending body portion 27b. The plunger 27 is molded from resilient, elastic material such as synthetic rubber, or other suitable grease-resistant elastomeric or plastic material. The annular sealing lip portion 27a normally extends outwardly at least to the internal diameter of container 10, so that a seal may be maintained with the interior of the container when the grease gun is used with bulk-filled grease. As shown in the drawings, the gun is being used with a grease cartridge C which is received in grease container 10, and the sealing lip portion 27a is flexed inwardly so that the plunger assembly 26 may be received within the cartridge C and form a seal therewith.

In the illustration given, body portion 27b of plunger 27 is sandwiched between a front disc 28 and a rear disc 29. Preferably, as shown, front disc 28 is cup-shaped, and provides an annular flange 28a which extends around the sides of the plunger. If desired, as shown, an offset or annular flange may be provided in the sidewall of plunger 27 as indicated at 27c for receiving the rearward end of the disc sidewall 28a, and providing a smooth junction between the outer faces of sidewall 28a and sealing lip portion 27a.

Figure 5:
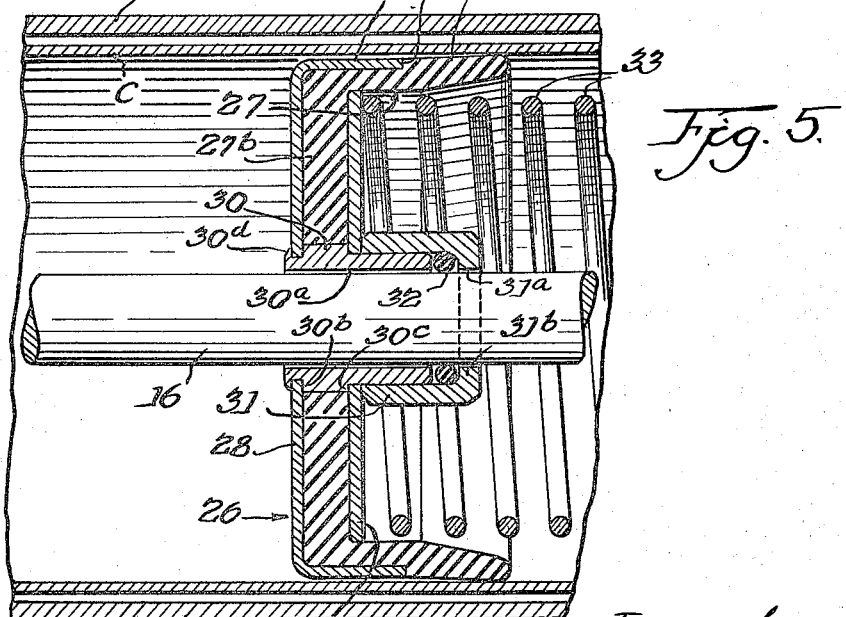
FIGURE 5 is an enlarged fragmentary sectional view of the grease gun of FIG. 1 showing the plunger assembly and associated components.

A plunger sleeve 30 extends through central openings respectively in disc 28, plunger body 27b, and disc 29. Sleeve 30 is provided internally with a bore 30a for slidably receiving and guiding rod 16. The forward portion of sleeve 30 is provided with spaced annular shoulders 30b and 30c, which respectively bear against the inner faces of discs 28 and 29, as shown in FIG. 5. Front disc 28 is locked to sleeve 30 against shoulder 30b by swedging at 30d. Rear disc 29 is held against shoulder 30c by the forward end of cap 31 which is press fitted onto the rearward portion of sleeve 30. Cap 31 provides a central opening 31a through which rod 16 slidably extends. The transverse rear wall 31b of cap 31 is spaced from the rear end of sleeve 30 to permit the insertion of a sealing or packing member, such as O-ring 32, which may be formed of grease-resistant synthetic rubber or other suitable material. The sealing member 32 permits relative sliding movement between rod 16 and the plunger assembly 26, while preventing grease from passing through the plunger assembly.

Plunger assembly 28 may be used without any means for urging it toward the front of the grease gun other than the suction created by the high pressure cylinder means which will subsequently be described. However, it is preferred to provide a compression spring means to assist in urging the plunger assembly toward the front of the grease gun. In the illustration given, there is shown a compression spring 33 which is disposed around rod 16 between plunger assembly 26 and rear cap 11. If desired, a relatively lightweight spring may be used, and this has an advantage in facilitating the insertion of the grease cartridge, as will subsequently be explained.

An access cap 34 is removably mounted on the front end of container 10. In the illustration given, cap 34 provides a forwardly extending cup shaped portion 34a and an enlarged annular portion 34b, which is internally threaded for connection to the externally threaded front end portion of container 10, as shown more clearly in FIG. 3. A high-pressure cylinder 35 is mounted on front cap 34 and provides a rearwardly opening bore 35a aligned with the axis of container 10. A piston guide 36 is secured to the rear end portion of cylinder 35, and forms a rearward extension of the cylinder. Guide 36 provides a bore 36a aligned with the bore 35a and forming a rearward extension thereof.

In the illustration given, high pressure cylinder 35 is in the form of a tubular body with the bore 35a extending longitudinally therethrough. Cylinder body 35 provides a reduced rear end portion 35b which is separated from the forward portion of the body by an annular shoulder 35c. In the illustration given, reduced portion 35b extends through a central opening 34c in the forward wall of cap 34 with shoulder 35c bearing against the outer face of the cap. If desired, as shown, the outer face of the cap may be recessed at 34d to provide a seat for cylinder body 35 and shoulder 35c.

The rearward portion 35b of the cylinder body may be externally threaded, as shown more clearly in FIG. 3, to receive the internally threaded forward end of guide 36, which in the illustration given is also in the form of a tubular body having the bore 36a extend longitudinally therethrough. When the forward end of guide 36 is run up fully onto cylinder portion 35b, the parts are rigidly supported and securely clamped against the front wall of cap 34.

A suitable piston means such as piston 37 provided on the forward end of plunger rod 16 for reciprocation in guide 36 and cylinder 35. In the illustration given, piston 37 is formed of a separate cylindrical metal body, and is provided with an attachment recess 37a in the rear end thereof. The forward end rod 16 is provided with a head 16b which is separated by a sloping shoulder 16c from a reduced portion 16d. Head 16b is loosely received in recess 37a and is locked therein by the crimping of the rear end of piston 37 at 37b about the sloping shoulder 16c, thereby providing a connection between the parts whereby the piston 37 can adjust to a slightly different axis of reciprocation than the axis of reciprocation of rod 16. The head 16b and the recess or socket 37a respectively provide opposed cylindrical portions 16e and 37c which cooperate to maintain piston 37 and rod 16 in approximately the same axial alignment, the cylindrical portion 16c being coaxial with the rod 16 and the cylindrical recess portion 37c being coaxial with the piston 37. The clearance between the cylindrical portions 16a and 37c and between the rest of head 16b and recess 37a permits slight axial adjustments of piston 37 with respect to rod 16 while the piston and rod remain in general axial alignment to facilitate the re-insertion of piston 37 in guide bore 36a as required whenever cap 34 is removed and replaced together with guide 36 and cylinder 35.

The piston 37 is shown in its rearwardmost position in FIGS. 1 and 3. As will be noted, in this position the piston is within the guide 36. When rod 16 is moved forwardly, piston 37 will advance to a position within cylinder 35, the reciprocation of piston 37 being indicated by the double arrow line in FIG. 3.

According to the present invention, there is provided inlet port means cooperating with guide 36 and cylinder 35 for admitting grease to the cylinder when piston 37 is withdrawn to its rearward position. In the illustration given, oppositely disposed slots 36b and 36c are formed in the sidewalls of guide 36. These slots provide communication between the bore 35a of the high pressure cylinder and the space surrounding guide 36 within cap extension 34a.

A valve body 38 is threadedly received within the outer end of bore 35a, and provides an outlet port 38a from the high pressure cylinder, which is controlled by a spring biased outlet check valve 39 (FIGS. 1 and 3). The compression spring 40 which urges valve 39 to closed position is held in place by an externally threaded retainer ring 41 which is received within the threaded outer end portion of valve body 38. An applicator pipe 42 is threadedly received within the outer end of valve body 38, and a grease fitting connector 43 is mounted on the forward end of pipe 42. Since these elements are well known in the art, it is not believed it will be necessary to describe them further herein.

The grease gun described herein is adapted for use with both cartridge-packaged greases and bulk-filled greases. To facilitate the selective conversion from bulk greases to cartridge greases or vice versa, a special sealing gasket 44 is provided at the forward end of the gun. As shown more clearly in FIG. 3, gasket 44 has a central relatively thick body portion 44a which is integrally connected to a rearwardly and outwardly extending annular lip portion 44b and to an outwardly and transversely extending seating or anchor portion 44c. As shown in FIG. 3, the annular anchor portion 44c extends into an annular recess 34e provided on the inside of cap 34 between flange 34b and the forward extension 34a. This permits anchor portion 44c to be clamped in place by the front edge of container 10, which is brought to bear against the rear side thereof as cap 34 is screwed onto container 10. This provides a seal which is effective for preventing bulk grease from escaping through the threaded connection between cap 34 and container 10.

When the gun is used with cartridge packaged greases, as illustrated in FIGS. 1 and 3, the lip 44b bears against the front end cap F of the cartridge C. As is well known in the art, the front end cap F is permanently affixed to the cartridge C, being provided with a removable closure for covering the central opening O.

Gasket 44 should be formed of a resilient flexible material, such as synthetic rubber (e.g. neoprene) or other elastomeric or plastic material which is grease resistant. With the construction shown, a seal can be obtained between lip 44b and the front cap F of the grease cartridge, which greatly facilitates the introduction of the grease cartridge.

As will be noted, no means is provided for retracting the plunger assembly 26. Consequently, after substantially all of the grease has been dispensed, plunger 26 will be near the forward end of the barrel, and will remain there when cap 34 is unscrewed, and the empty grease cartridge removed. After removal of the rear cap from the new grease cartridge thereby providing the grease cartridge with an open rear end as shown in FIG. 4, and the removal of the knock-out closure from the front end of the cartridge, the cartridge can be readily inserted in the following manner without loss of grease.

The rear end of the cartridge is started into the open front end of container 10 until the grease therein contacts plunger assembly 26 in its forward position. At this time, of course, the cartridge will be projecting outwardly from container 10. Flange 34b of cap 34 is placed over the front end of the cartridge in the same relation as shown in FIGS. 1 and 3 with gasket lip 44b pressing against the cartridge front end cap F and thereby providing a seal. The insertion of the grease cartridge can then be completed by merely pushing the cartridge into the barrel of the gun, which will force plunger assembly 26 toward the rear of the gun, and permit cap 34 to be threadedly attached to container 10. No grease can escape during this process because of the seal provided between gasket lip 44b and the front end of the cartridge.

As shown more clearly in FIG. 3, the rearward portion of the piston guide 36 provides a recess 36d of larger rearward diameter than the diameter of guide bore 36a. As shown, the guide bore 36a and the piston bore 35a have substantially the same diameter. The rearward portion of guide 36 provides walls 36e converging about recess 36d toward guide bore 36a. The forward end of recess 36d is aligned with the rearward end of guide bore 36a and has substantially the same diameter. This construction facilitates the reinsertion of the piston 37 within guide bore 36a as cap 34 is replaced on the forward end of container 10. Also facilitating the reinsertion of piston 37 within bore 36a is the previously described interconnection between socket 37a and head 16b. Where the grease cartridge is inserted as described above, it will be understood that piston 37 must automatically reinsert itself within bore 36a, and therefore these cooperating features are of considerable importance in connection with the cartridge loading of the gun. They are also valuable whenever cap 34 is removed and replaced, such as may be necessary to inspect or service the interior of the gun.

After the new cartridge has been inserted, the grease can be dispensed as required by the operator grasping the hand grips 13 and 20, and causing rod 16 to reciprocate piston 37, as previously described. On each forward stroke, the grease within high pressure cylinder 35 will be forced out through port 38a, while the return stroke will create suction within cylinder 35 which will draw in a new supply of grease through the ports 36b and 36c. The plunger assembly 26 will advance due to this suction effect and the action of spring 33 so that the forward portion of the grease container and cap 34 are kept substantially full of grease.

As previously indicated, the gun of this invention can also be used for bulk filled greases. For this purpose, a filler plug 45 is threadedly received in a filler port 34f provided in the side wall of cap extension 34a. By unscrewing plug 45, a conduit connected to a source of bulk grease can be attached to cap 34, and the grease can be pumped under pressure into cap 34 and container 10. It will be understood that the cartridge C will not be employed. As the grease is pumped into container 10, it will force plunger assembly 26 towards the rear of the gun. Preferably means is provided at the rear of the gun for cooperating with the sealing lip 27a to provide a positive seal so that continued introduction of grease under pressure after the plunger assembly has reached the rear of the container will not cause grease to be forced past the plunger assembly and out through the rear of the gun. While rear cap 11 is preferably permanently attached to barrel 10, it is not sealed thereto. Moreover, it is desirable to provide a vent port 11a in cap 11 to maintain normal atmospheric pressure at all times rearwardly of plunger assembly 26.

In the illustration given, there is provided a sealing disc 46 (FIG. 4) which provides a forwardly and inwardly extending annular lip 46a that is adapted to cooperate with plunger lip 27a when the plunger is fully retracted. In the pressure filling of grease with no cartridge in the barrel, the lip 46a holds plunger lip 27a against the container wall when otherwise grease might be forced past the plunger lip.

Sealing disc 46 may be held in place by any suitable means. The illustration given shows it clamped against cap 11 by the enlarged end portion 18a of bushing 18, which provides a suitable offset or recess 18c. The offset 18c may be omitted and the disc 46 held only by end portion 18a.

Piston 37 is preferably of a slightly larger diameter than rod 16 so that the rearwardmost portion of the piston serves as a stop to limit forward movement of plunger assembly 26. In the illustration given, plunger assembly 26 engages the rear end of piston 16 while plunger lip 27a is retained within the forward portion of container 10.

While this invention has been described in relation to a specific preferred embodiment thereof, and many details have been set forth for purpose of illustration, it will be apparent to those skilled in the art that the invention is susceptible to additional embodiments and that certain of the details set forth herein can be varied considerably without departing from the scope of the invention.

I claim:
1. In a hand grease gun for use with cartridge-packaged of pressure-filled grease, said gun including an elongated cylindrical grease container, a plunger rod axially disposed within said container for axial reciprocation therein, said rod having a rearward portion slidably projecting through said rear cap to a point rewardly thereof, an access cap removably mounted on the front end of said container, a high pressure cylinder mounted on said access cap providing a rearwardly opening bore aligned with the axis of said cylinder, a piston guide secured to said high pressure cylinder and forming a rearward extension thereof, said guide providing a bore aligned with the bore of said cylinder, piston means provided on the forward end of said plunger rod for reciprocation in said guide and cylinder, the combination therewith of:
 (a) a stationary hand grip mounted on the outside of said closure cap and extending laterally therefrom without interfering with the sliding action of rearward portion of said rod which extends through the cap;
 (b) movable hand grip means pivotally connected to the projecting rear end of said rod for cooperation with said stationary hand grip to reciprocate said rod within said piston guide and high pressure cylinder,
  said movable hand grip comprising the only means for moving and reciprocating said rod; and
 (c) grease plunger means slidably mounted on said rod for urging grease toward the forward end of said grease container,
  said plunger means being slidably retractable on said rod to the rearward portion of said container by the introduction of a cartridge of grease or of pressure-filled bulk grease into the forward portion thereof while said rod remains stationary.

2. The grease gun combination of claim 1 wherein the rearward portion of said piston guide provides a recess of larger rearward diameter than the diameter of said guide bore, said guide bore and said piston bore having substantially the same diameter, said guide rearward portion providing walls converging about said recess toward said guide bore, the forward end of said recess being aligned with the rearward end of said guide bore and having substantially the same diameter.

3. The combination of claim 1 wherein the rearward portion of said piston means and the forward portion of said rod respectively provide interconnecting head and socket means with clearance therebetween permitting slight axial adjustments of said piston means with respect to said rod, said head and socket means having opposed cylindrical portions coaxial with said piston means and rod for mounting said piston means and said rod in approximately the same axial alignment.

4. The combination of claim 2 wherein the rearward portion of said piston means and the forward portion of said rod respectively provide interconnecting head and socket means with clearance therebetween permitting slight axial adjustments of said piston means with respect to said rod, said head and socket means having opposed cylindrical portions coaxial with said piston means and rod for mounting said piston means and said rod in approximately the same axial alignment.

References Cited by the Examiner
UNITED STATES PATENTS

| | | | |
|---|---|---|---|
| 1,972,161 | 9/1934 | Parker | 222—260 |
| 2,082,521 | 6/1937 | Schneider et al. | 222—260 X |
| 2,557,374 | 6/1951 | Cripe | 222—378 X |

ROBERT B. REEVES, *Primary Examiner.*

HADD S. LANE, *Examiner.*